United States Patent
Kiapour et al.

(10) Patent No.: US 11,301,511 B2
(45) Date of Patent: *Apr. 12, 2022

(54) PROJECTING VISUAL ASPECTS INTO A VECTOR SPACE

(71) Applicant: eBay Inc., San Jose, CA (US)

(72) Inventors: Mohammadhadi Kiapour, Chapel Hill, NC (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/815,821

(22) Filed: Mar. 11, 2020

(65) Prior Publication Data
US 2020/0250224 A1 Aug. 6, 2020

Related U.S. Application Data

(63) Continuation of application No. 15/353,900, filed on Nov. 17, 2016, now Pat. No. 10,628,481.

(51) Int. Cl.
*G06F 16/51* (2019.01)
*G06F 16/583* (2019.01)
(Continued)

(52) U.S. Cl.
CPC .......... *G06F 16/5838* (2019.01); *G06F 16/25* (2019.01); *G06F 16/51* (2019.01);
(Continued)

(58) Field of Classification Search
CPC ...... G06F 16/5838; G06F 16/51; G06F 16/25; G06F 17/271; G06F 3/0482; G06F 17/2235; G06K 9/46; G06K 9/4604; G06K 9/627
(Continued)

(56) References Cited

U.S. PATENT DOCUMENTS 7,251,637 B1 * 7/2007 Caid .................... G06K 9/4623
706/15
9,058,470 B1 6/2015 Nissan et al.
(Continued)

FOREIGN PATENT DOCUMENTS

WO 2018/094208 A1 5/2018

OTHER PUBLICATIONS

Amendment After Allowance Under 37 CFR filed on Mar. 11, 2020 U.S. Appl. No. 15/353,900, 8 pages.
(Continued)

*Primary Examiner* — Hanh B Thai
(74) *Attorney, Agent, or Firm* — Holland & Hart LLP

(57) ABSTRACT

In various example embodiments, a system and method for projecting visual aspects into a vector space are presented. A query that includes visual data is received by the system from a client device. A visual aspect indicated in the visual data is analyzed. One or more symbols that correspond to the analyzed visual aspect is generated by the system. The analyzed visual aspect is projected into a vector space using the one or more symbols. A group of projections are identified, the group of projections being within a predetermined distance from the projected visual aspect in the vector space. An interface that depicts the further visual aspects is generated. The interface is displayed on the client device.

17 Claims, 9 Drawing Sheets

(51) Int. Cl.
| | |
|---|---|
| *G06F 16/25* | (2019.01) |
| *G06K 9/62* | (2022.01) |
| *G06F 40/211* | (2020.01) |
| *G06V 10/40* | (2022.01) |
| *G06V 10/44* | (2022.01) |
| *G06F 40/134* | (2020.01) |
| *G06F 3/0482* | (2013.01) |

(52) U.S. Cl.
CPC ............ *G06F 40/211* (2020.01); *G06K 9/627* (2013.01); *G06V 10/40* (2022.01); *G06V 10/44* (2022.01); *G06F 3/0482* (2013.01); *G06F 40/134* (2020.01)

(58) Field of Classification Search
USPC ........................................................ 707/737
See application file for complete search history.

(56) References Cited

U.S. PATENT DOCUMENTS

| | | | |
|---|---|---|---|
| 10,628,481 B2 | 4/2020 | Kiapour et al. | |
| 2003/0048307 A1 | 3/2003 | Bryan et al. | |
| 2004/0090472 A1* | 5/2004 | Risch .................. | G06F 16/9038 715/853 |
| 2005/0257400 A1* | 11/2005 | Sommerer ............ | G06F 16/954 36/13 |
| 2006/0061595 A1 | 3/2006 | Goede et al. | |
| 2011/0007076 A1* | 1/2011 | Nielsen .................. | G06F 16/29 345/441 |
| 2011/0181597 A1 | 7/2011 | Cardno et al. | |
| 2011/0261049 A1 | 10/2011 | Cardno et al. | |
| 2013/0297582 A1 | 11/2013 | Zukovsky et al. | |
| 2013/0297590 A1 | 11/2013 | Zukovsky et al. | |
| 2014/0201219 A1 | 7/2014 | Kim et al. | |
| 2015/0154503 A1 | 6/2015 | Goswami et al. | |
| 2016/0170994 A1* | 6/2016 | Soderberg .............. | G06Q 30/02 707/748 |
| 2017/0212661 A1* | 7/2017 | Ito ....................... | G06F 3/04845 |
| 2018/0137142 A1 | 5/2018 | Kiapour et al. | |
| 2018/0181569 A1* | 6/2018 | Jarr ...................... | G06F 16/5838 |
| 2018/0296084 A1* | 10/2018 | Kawahara ............ | A61B 3/0041 |
| 2019/0034694 A1* | 1/2019 | Ross ................... | G06F 16/5838 |
| 2019/0051056 A1* | 2/2019 | Chiu ....................... | G06T 7/136 |

OTHER PUBLICATIONS

First Action Interview—Pre-Interview Communication received for U.S. Appl. No. 15/353,900, dated Feb. 26, 2019, 4 pages.
First Action Interview-Office Action Summary received for U.S. Appl. No. 15/353,900, dated Jul. 5, 2019, 4 pages.
Notice of Allowance received for U.S. Appl. No. 15/353,900, dated Dec. 12, 2019, 11 pages.
Response to First Action Interview Office Action Summary filed on Sep. 5, 2019 , for U.S. Appl. No. 15/353,900, dated Jul. 5, 2019, 11 pages.
Response to First Action interview-Pre-Interview communication filed on Apr. 22, 2019 for U.S. Appl. No. 15/353,900 , dated Feb. 26, 2019, 5 pages.
Response to Rule 312 Communication Received on Mar. 24, 2020 for U.S. Appl. No. 15/353,900, 2 pages.
International Report on Patentability received for PCT Application No. PCT/US2017/062299, dated May 31, 2019, 6 pages.
International Search Report received for PCT Patent Application No. PCT/US2017/062299, dated Feb. 16, 2018, 3 pages.
International Written Opinion received for PCT Patent Application No. PCT/US2017/062299, dated Feb. 16, 2018, 4 pages.
Google Code Archive—Long-term storage for Google Code Project Hosting., Retrieved from Internet URL: <https://code.google.com/archive/p/word2vec/>, Accessed on Jul. 27, 2020, 6 pages.
Mikolov et al., "Distributed Representations of Words and Phrases and their Compositionality", Proceedings of the 26th International Conference on Neural Information Processing Systems, vol. 2, Dec. 2013, 9 pages.
Mikolov et al., "Efficient Estimation of Word Representations in Vector Space", ICLR, Retrieved from the internet URL :<https://arxiv.org/abs/1301.3781>, Sep. 7, 2013, 12 pages.

* cited by examiner

PROJECTING VISUAL ASPECTS INTO A VECTOR SPACE

CROSS REFERENCE TO RELATED APPLICATIONS

This Application is a Continuation of application Ser. No. 15/353,900 filed on Nov. 17, 2016, entitled "PROJECTING VISUAL ASPECTS INTO A VECTOR SPACE," the entire contents of this application is incorporated herein by reference in its entirety.

TECHNICAL FIELD

Embodiments of the present disclosure generally relate to the technical field of special-purpose machines that facilitate user interaction with visual data including computerized variants of such special-purpose machines and improvements to such variants, and to the technologies by which such special-purpose machines become improved compared to other special-purpose machines that facilitate user interaction with visual data. Specifically, the present disclosure addresses systems and methods of projecting visual aspects into a vector space.

BACKGROUND

Conventionally, a user can search items from an item inventory using a textual search query. However, often times, the terms from the search query will not match with predefined labels used to describe the items from the item inventory. In this regard, conventional systems are unable to handle queries, from a user, with inputs that are outside the scope of the predefined labels.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
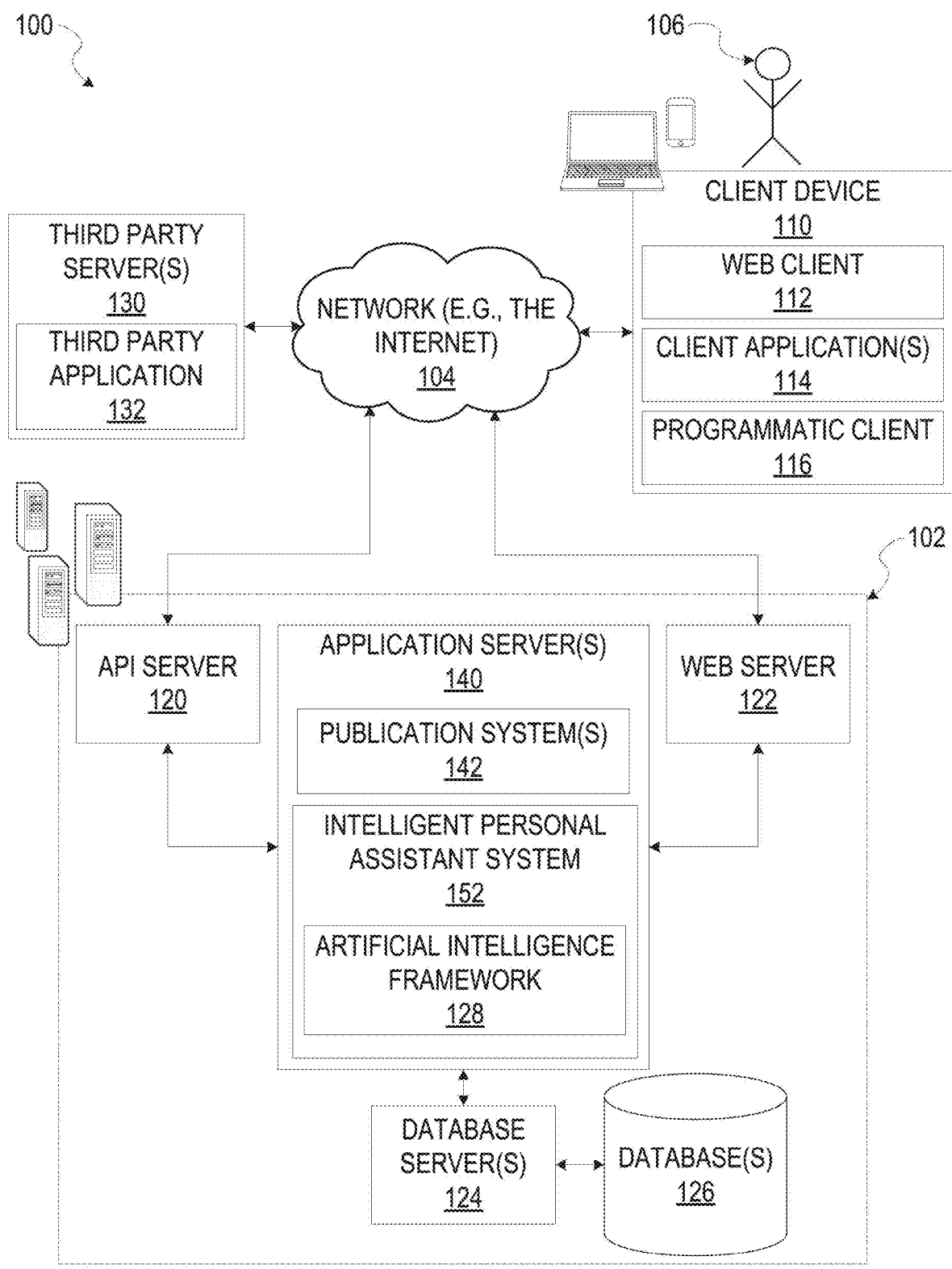
FIG. 1 is a block diagram illustrating a networked system, according to some example embodiments.

The description that follows describes systems, methods, techniques, instruction sequences, and computing machine program products that illustrate example embodiments of the present subject matter. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a system is configured to project one or more visual aspects into a vector space. Visual aspects include features or characteristics of an image that are visually perceptible. Once the visual aspects are projected into the vector space, their similarities are measured based on their distances from each other. In various example embodiments, the system receives visual data (e.g., images or video) that indicates the one or more visual aspects. In other words, the visual data includes content that depicts the visual aspects. In further example embodiments, the system receives a description that describes the visual data. Accordingly, the system uses either the description of the visual data, the visual data, or a combination of both to project (e.g., generate a projection) the visual aspects into the vector space, as further explained below.

In various example embodiments, a user provides the visual data as a search query. The visual data may be an image of an item, and the system may accordingly project a visual aspect of the item into the vector space. The system will then identify other projections of other visual aspects in the vector space that are similar to the visual aspect from the search query. Once the other visual aspects are identified, the system will present the search results of the other visual aspects in a user interface.

Example methods (e.g., algorithms) facilitate projections of visual aspects, providing a user interface that includes search results of other visual aspects, or both, and example systems (e.g., special-purpose machines) are configured to facilitate projections of the visual aspects, providing the user interface that includes the search results of other visual aspects, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Accordingly, one or more of the methodologies discussed herein may increase the accuracy of search queries, thereby obviating a need to process multiple search queries, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 is shown. A networked system 102, in the example forms of a network-based publication system, provides server-side functionality via a network 104 (e.g., the Internet or wide area network (WAN)) to one or more client devices 110. FIG. 1 illustrates, for example, a web client 112 (e.g., a browser), a client application 114, and a programmatic client 116 executing on client device 110.

The client device 110 may comprise, but is not limited to, a mobile phone, desktop computer, laptop, portable digital assistants (PDAs), smart phones, tablets, laptops, multi-processor systems, microprocessor-based or programmable consumer electronics, game consoles, set-top boxes, or any other communication device that a user may utilize to access the networked system 102. In some embodiments, the client device 110 includes components that are used to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, and publishes publications comprising item listings of products available on the network-based publication system. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user). Conversely if the e-commerce site application is not included in the client device 110, the client device 110 may use its web browser to access the e-commerce site (or a variant thereof) hosted on the networked system 102.

A user 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 host the publication system 142 and the intelligent personal assistant system 152, each of which may comprise one or more modules, engines, or applications and each of which may be embodied as hardware, software, firmware, circuitry, or any combination thereof. The application servers 140 are, in turn, shown to be coupled to one or more database servers 124 that facilitate access to one or more information storage repositories or database(s) 126. In an example embodiment, the databases 126 are storage devices that store information communicated (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional publication functions that are supported by the relevant applications of the networked system 102.

The publication systems 142 provide a number of publication functions and services to users 106 that access the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, and intelligent personal assistant system 152 could also be implemented as standalone software programs, which do not necessarily have networking capabilities.

The web client 112 accesses the publication system 142 via the web interface supported by the web server 122. Similarly, the programmatic client 116 accesses the various services and functions provided by the publication system 142 via the programmatic interface provided by the API server 120. The programmatic client 116 may, for example, be a seller application to enable sellers to author and manage listings on the networked system 102 in an off-line manner, and to perform batch-mode communications between the programmatic client 116 and the networked system 102.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 4-6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
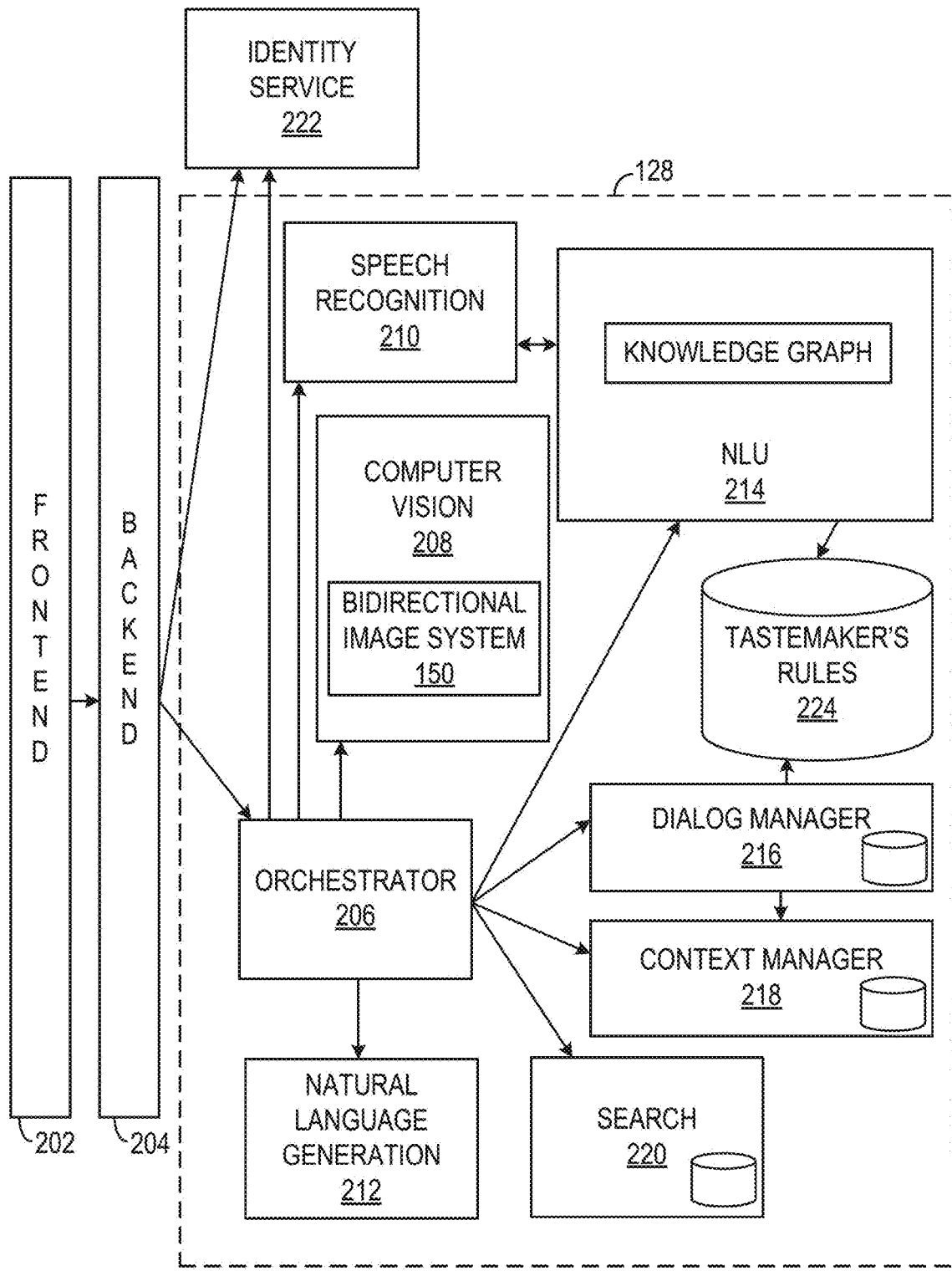
FIG. 2 is a block diagram showing the architectural details of an intelligent personal assistant system, according to some example embodiments.

FIG. 2 is a block diagram showing the architectural details of an intelligent personal assistant system 152, according to some example embodiments. Specifically, the intelligent personal assistant system 152 is shown to include a front end component 202 (FE) by which the intelligent personal assistant system 152 communicates (e.g., over the network 104) with other systems within the network architecture 100. The front end component 202 can communicate with the fabric of existing messaging systems. As used herein, the term messaging fabric refers to a collection of APIs and services that can power third party platforms such as Facebook messenger, Microsoft Cortana and other "bots". In one example, a messaging fabric can support an online commerce ecosystem that allows users to interact with commercial intent. Output of the front end component 202 can be rendered in a display of a client device, such as the client device 110 in FIG. 1 as part of an interface with an intelligent personal assistant (e.g., "bot").

The front end component 202 of the intelligent personal assistant system 152 is coupled to a back end component 204 for the front end (BFF) that operates to link the front end component 202 with an artificial intelligence framework 128. The artificial intelligence framework 128 includes several components discussed below.

In one example of an intelligent personal assistant system 152, an AI orchestrator 206 orchestrates communication of components inside and outside the artificial intelligence framework 128. Input modalities for the AI orchestrator 206 are derived from a computer vision component 208 (e.g., computer vision system), a speech recognition component 210, and a text normalization component which may form part of the speech recognition component 210. The computer vision component 208 (e.g., computer vision system) can identify objects and attributes from visual input (e.g. photo). The speech recognition component 210 converts audio signals (e.g. spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 128 further includes a natural language understanding or NLU component 214 that operates to parse and extract user intent and intent parameters (for example mandatory and/or optional parameters). Although not shown in FIG. 2, the NLU component 214 may also include sub-components such as a spelling corrector (speller), a parser, a Named Entity Recognition (NER) sub-component, and a Word Sense Detector (WSD). The NLU component 214 may also include a knowledge graph, as shown in FIG. 2.

The artificial intelligence framework 128 further includes a dialog manager 216 that operates to understand a "completeness of specificity" (for example of an input, such as a search query or utterance) and decide on a next action type and a parameter (e.g. "search" or "request further information from user"). In one example, the dialog manager 216 operates in association with a context manager 218 and an NLG component 212 (or Natural Language Generation component). The context manager 218 manages the context and communication of a user with respect to the intelligent personal assistant (e.g., "bot") and the artificial intelligence associated with the intelligent personal assistant. The context manager 218 comprises two parts: long term history and short term memory. Data entries into one or both of these parts can include the relevant intent and all parameters and all related results of a given input, bot interaction, or turn of communication, for example. The NLG component 212 operates to compose a natural language utterance out of an AI message to present to a user interacting with the intelligent bot.

A search component 220 is also included within the artificial intelligence framework 128. Although not shown, the search component 220 has front-end and back end units. The back end unit operates to manage item and product inventory and provide functions of searching against the inventory, optimizing towards a specific tuple of intent and intent parameters. An identity service 222 component, that may or may not form part of artificial intelligence framework 128, operates to manage user profiles, for example explicit information in the form of user attributes, e.g. "name", "age", "gender", "geolocation", but also implicit information in forms such as "information distillates" such as "user interest", or "similar persona", and so forth.

The functionalities of the artificial intelligence framework 128 can be set into multiple parts, for example a decision execution and context parts. In one example, the decision execution part includes operations by the AI orchestrator 206, the NLU component 214 and its subcomponents, the dialog manager 216, the NLG component 212, the computer vision component 208 and speech recognition component 210. The context part of the AI functionality relates to the parameters (implicit and explicit) around a user and the communicated intent (for example, towards a given inventory, or otherwise). In order to measure and improve AI quality over time, the artificial intelligence framework 128 is trained using sample queries (e.g. a dev set) and tested on a different set of queries (e.g. an eval set), both sets to be developed by human curation. Also, the artificial intelligence framework 128 is to be trained on transaction and interaction flows defined by experienced curation specialists, or human override 224. The flows and the logic encoded within the various components of the artificial intelligence framework 128 define what follow-up utterance or presentation (e.g. question, result set) is made by the intelligent assistant based on an identified user intent.

Reference is made further above to example input modalities of the intelligent online personal assistant (e.g., "bot") in an intelligent personal assistant system 152. The intelligent personal assistant system 152 seeks to understand a user's intent (e.g. targeted search, compare, shop/browse, and so forth) and any mandatory parameters (e.g. product, product category, item, and so forth) and/or optional parameters (e.g. explicit information, e.g. aspects of item/product, occasion, and so forth) as well as implicit information (e.g. geolocation, personal preferences, age and gender, and so forth) and respond to the user with a well thought out or "intelligent" response. Explicit input modalities can include text, speech, and visual input and can be enriched with implicit knowledge of user (e.g. geolocation, previous browse history, and so forth). Output modalities can include text (such as speech, or natural language sentences, or product-relevant information, and images on the screen of a smart device e.g. client device 110. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. The user may not know what an item is called, or it may be hard or even impossible to use text for fine detailed information that only an expert may know, for example a complicated pattern in apparel or a certain style in furniture. Moreover, it is inconvenient to type complex text queries on mobile phones and long text queries typically have poor recall. Thus, with reference to FIG. 2, key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

As shown, the computer vision component 208 includes a bidirectional image system 150 that provides functionality operable to project visual aspects into a vector space. Once projected into the vector space, the projections of the visual aspects are compared with one another in order to measure their similarities. The bidirectional image system 150 will receive visual data and project a visual aspect of the visual data into the vector space. Visual data, in some instances, is received from a client device (e.g., client device 110). Visual data is also accessed from a database (e.g., database 126). In further embodiments, the visual data is received from the third party servers 130, the publication system 142, or other sources. Accordingly, the bidirectional image system 150 communicates with the publication systems 142 and the third party servers 130.

Figure 3:
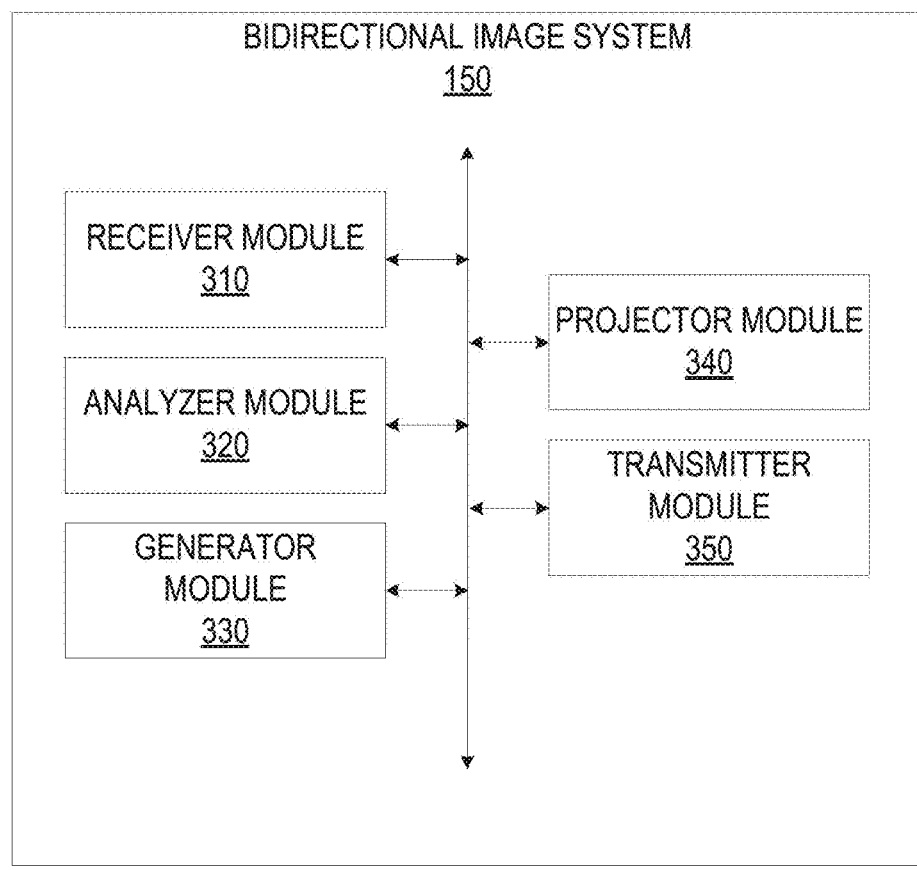
FIG. 3 is a block diagram illustrating components of the bidirectional image system, according to some example embodiments

FIG. 3 is a block diagram illustrating components of the bidirectional image system 150, according to some example embodiments. The bidirectional image system 150 is shown as including a receiver module 310, an analyzer module 320, a generator module 330, a projector module 340, and a transmitter module 350, all configured to communicate with each other (e.g., via a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the receiver module 310 is configured to receive visual data. In some instances, the receiver module 310 receives the visual data from a client device (e.g., client device 110). In further instances, the receiver module 310 receives the visual data from a database (e.g., database 126). In some instances, the visual data is an image of an item. In various example embodiments, the image depicts visual aspects of the item. Example visual aspects include a shape of the item, a design included in the item, a pattern shown on the item, a color of the item, condition of the item, and the like.

In various example embodiments, the receiver module 310 is configured to receive a description that corresponds to the visual data. For instance, the description includes a description of the item and the visual data is the image of the item. Therefore, the description of the item and the image of the item are both of the same item. Moreover, the description of the item may include keywords or phrases that specifically describe the visual aspects of the item.

In various example embodiments, the analyzer module 320 is configured to analyze a visual aspect that is indicated in the visual data (e.g., the image of the item). For instance, the analyzer module 320 analyzes a visual aspect that is depicted in a section of the received image. The analyzer module 320 may zoom in on the section of the received image to extract the visual aspect. Moreover, the analyzer module 320 is further configured to remove portions of the image that are outside of the section of the received image in order to extract the visual aspect.

In various example embodiments, the analyzer module 320 is configured to analyze the description of the item. For instance, the analyzer module 320 parses the description of the item to identify certain key words or key phrases that are used to describe the visual aspect of the item.

In various example embodiments, the generator module 330 is configured to generate one or more symbols that correspond to the visual aspect depicted in the image. The symbols may include alphanumeric characters or values. In some instances, the words or phrases that were parsed from the description are used by the generator module 330 to generate the one or more symbols. Accordingly, the generator module 330 is further configured to generate the one or more symbols based on the keyword parsed from the description of the item.

In various example embodiments, the symbols define the visual aspect. As an example, a specific symbol may be used to describe a certain shape (e.g., the number "123" to describe a circular shape). As another example, words that describe the visual aspect may be used as symbols (e.g., the word "circle" to describe the circular shape). In further example embodiments, the symbols are a combination of the words along with any other alphanumeric characters that are used to describe the visual aspect. For example, the symbols may include "123circle" to describe the circular shape.

In various example embodiments, certain symbols are mapped to certain visual aspects. Further, the mapping results from training a data set of sample visual aspects that are previously mapped or predetermined to match with a data set of symbols. In some instances, the training data includes previous search queries that are received and processed by the bidirectional image system 150.

In various example embodiments, a neural network is used to analyze the data set of sample visual aspects that are previously mapped to the data set of symbols in order to generate a mapping. Once generated, the mapping is used by the projector module 340 to project an analyzed aspect into a vector space.

In various example embodiments, the data set of sample visual aspects are previously mapped to the data set of symbols as a result of data curation. Examples of previously mapped data include: a shape of a bed frame that is previously mapped to the symbols "bed frame." Other examples of previously mapped data include a pattern or shape of a stool that is previously mapped to the symbols "bar stool."

Certain image textures may also be previously mapped to the symbols "texture A" or "texture B".

In various example embodiments, the projector module 340 is configured to project the analyzed aspect into a vector space. Moreover, the projector module 340 uses the generated one or more symbols to project the analyzed aspect into the vector space. For instance, the generated one or more symbols are converted into vector coordinates that position the projection of the analyzed aspect in the vector space. Accordingly, a projection of the analyzed aspect is established in the vector space based on the vector coordinates. The coordinates, in some instances, are values that position the projection of the aspect in the vector space.

In various example embodiments, a distance between the projections corresponds to a similarity between aspects of the projections. In other words, a smaller distance between a projection of a first aspect and a projection of a second aspect corresponds to a higher similarity between the first aspect and the second aspect. Alternatively, a larger distance between the projection of the first aspect and the projection of the second aspect corresponds to a lower similarity between the first aspect and the second aspect. In various example embodiments, the projections each include a set of coordinates in the vector space. Accordingly, the distance between projections is measured using the set of coordinates for each of the projections in the vector space.

In various example embodiments, the analyzer module 320 is further configured to automatically identify a group of projections that are within a predetermined distance from the projected aspect in the vector space. In other words, the projection of the analyzed aspect is within a predetermined distance from the group of projections. In various example embodiments, the analyzer module 320 determines a position of the projected visual aspect in the vector space. The analyzer module 320 further determines that the group of projections are within the predetermined distance from the position of the projected visual aspect.

In various example embodiments, the group of projections includes projections of further visual aspects indicated in further visual data. In some instances, the further visual aspects are visual aspects of a group of items. Accordingly, the further visual data includes information or data regarding the group of items. In some instances, the further visual data includes images of the group of items. For example, the further visual data includes item listings of the group of items and images or descriptions of the group of items. In further example embodiments, descriptions that correspond to the further visual aspects are also found in the item listings. Moreover, the projections of the further visual aspects are also projected into the vector space by the bidirectional image system 150.

In various example embodiments, the analyzer module 320 determines that the visual aspect and the further visual aspects both include a common characteristic. As an example, the visual aspect and the further visual aspects may each include a similar shape (e.g., a circular shape). Accordingly, the analyzer module 320 determines that the circular shape is present in both the visual aspect and the further visual aspects.

In various example embodiments, the generator module 330 is further configured to generate an interface that includes the further visual aspects. In some instances, the generator module 330 generates an interface that includes the images of the group of items that embody the further visual aspects. In further instances, the generator module 330 generates, in the interface, the descriptions of the further visual aspects.

In various example embodiments, the generator module 330 is further configured to generate, in the interface, a link that causes navigation to an item listing of an item from the group of items. For example, the generator module 330 generates a button in the interface that causes navigation to the item listing when the button is selected.

In various example embodiments, the generator module 330 generates, in the interface, a tag for the common characteristic. The common characteristic can be visually perceived in each of the visual aspects. In various example embodiments, the tag itself is received from the client device. For instance, upon viewing the combination of aspects, a user may choose to provide a tag to label the common characteristic. Alternatively, the tag for the common characteristic is previously stored in a database and is retrieved from the database (e.g., database 126).

In various example embodiments, the transmitter module 350 is configured to cause display of the generated interface on the client device (e.g., the client device 110). The transmitter module 350 transmits data over the network 104 to the client device, which, when received by the client device, causes display of the generated interface.

Figure 4:
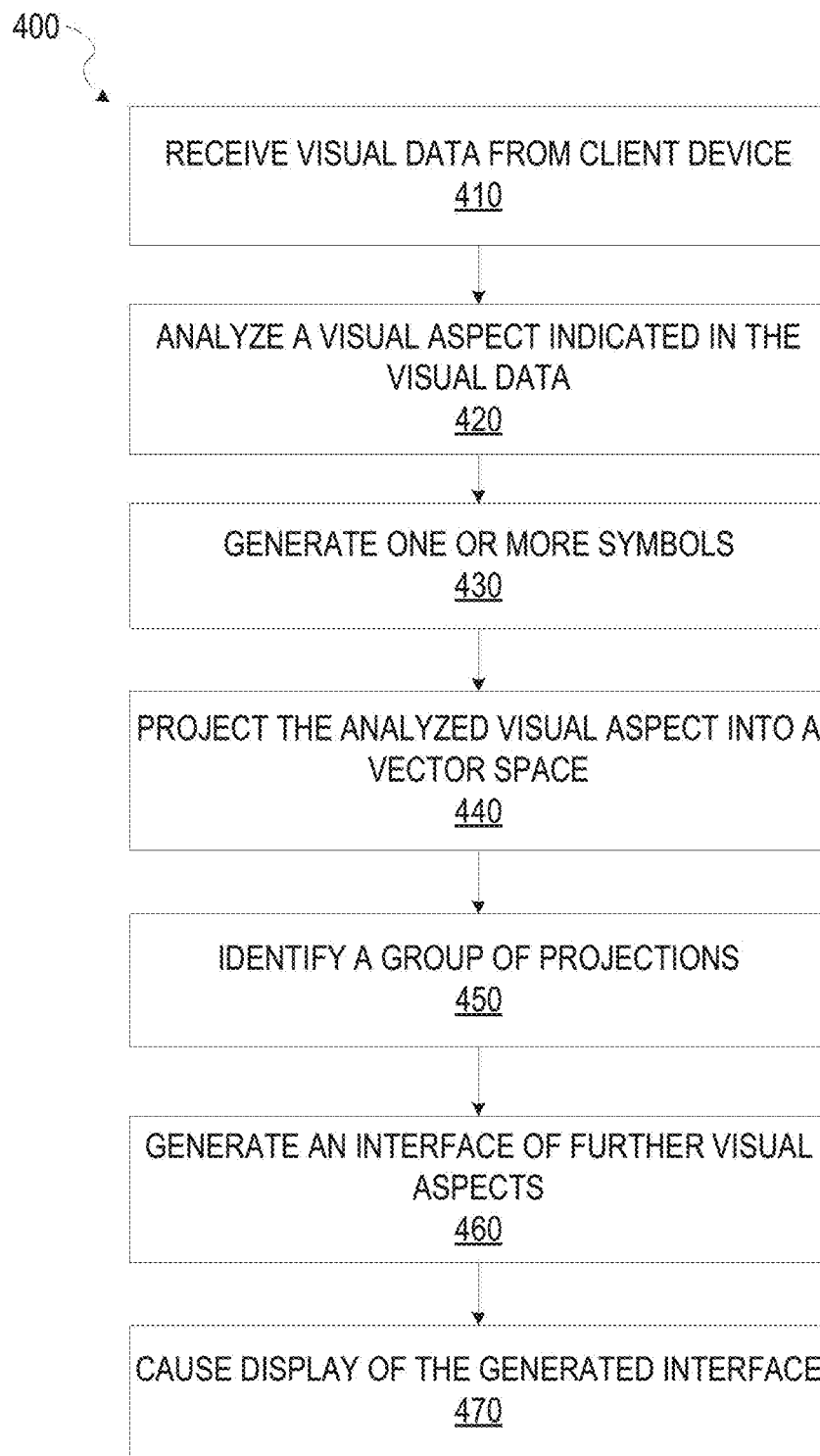
FIGS. 4-6 are flowcharts illustrating operations of the bidirectional image system in performing a method of projecting a visual aspect into a vector space, according to some example embodiments.
Figure 5:
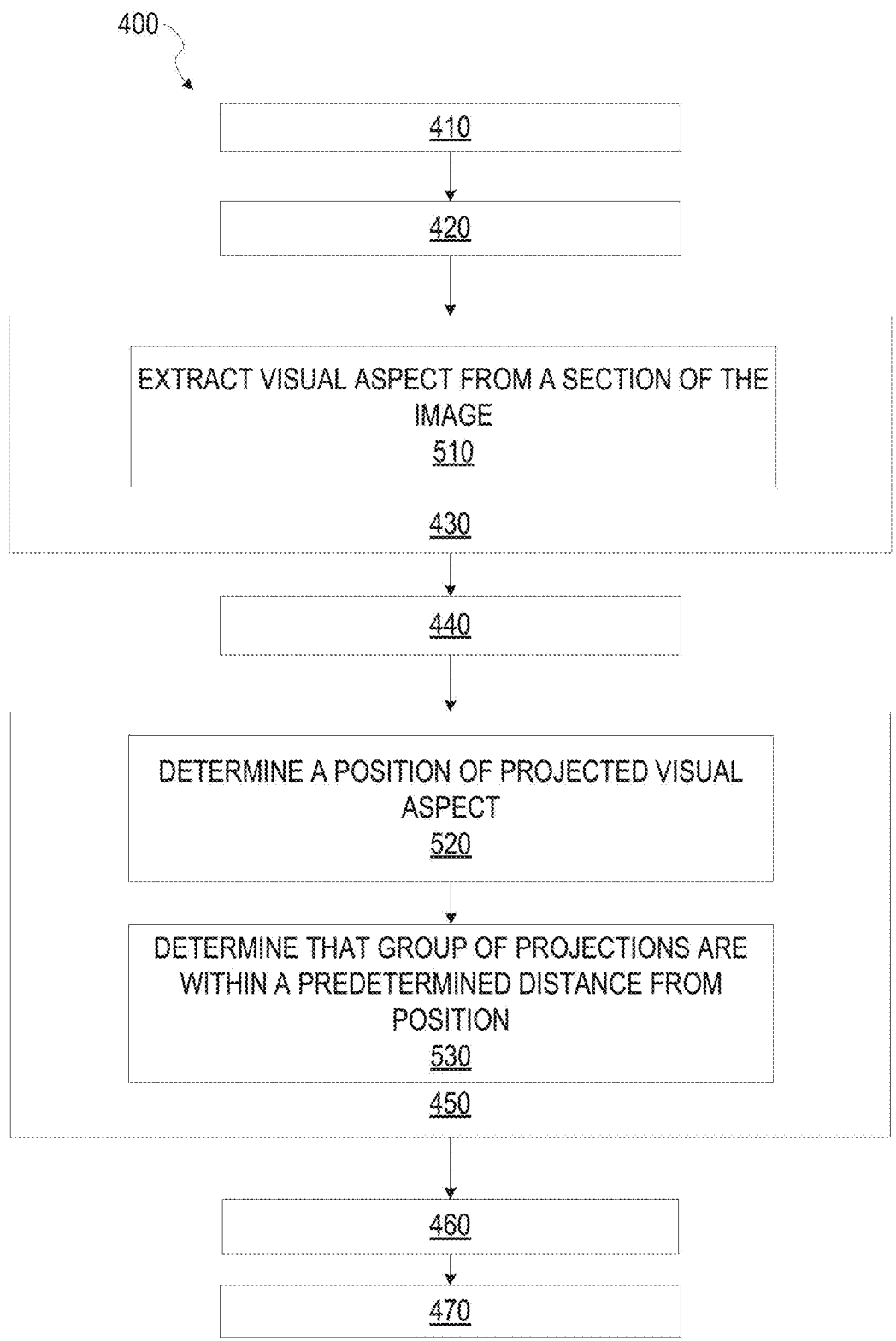
Figure 6:
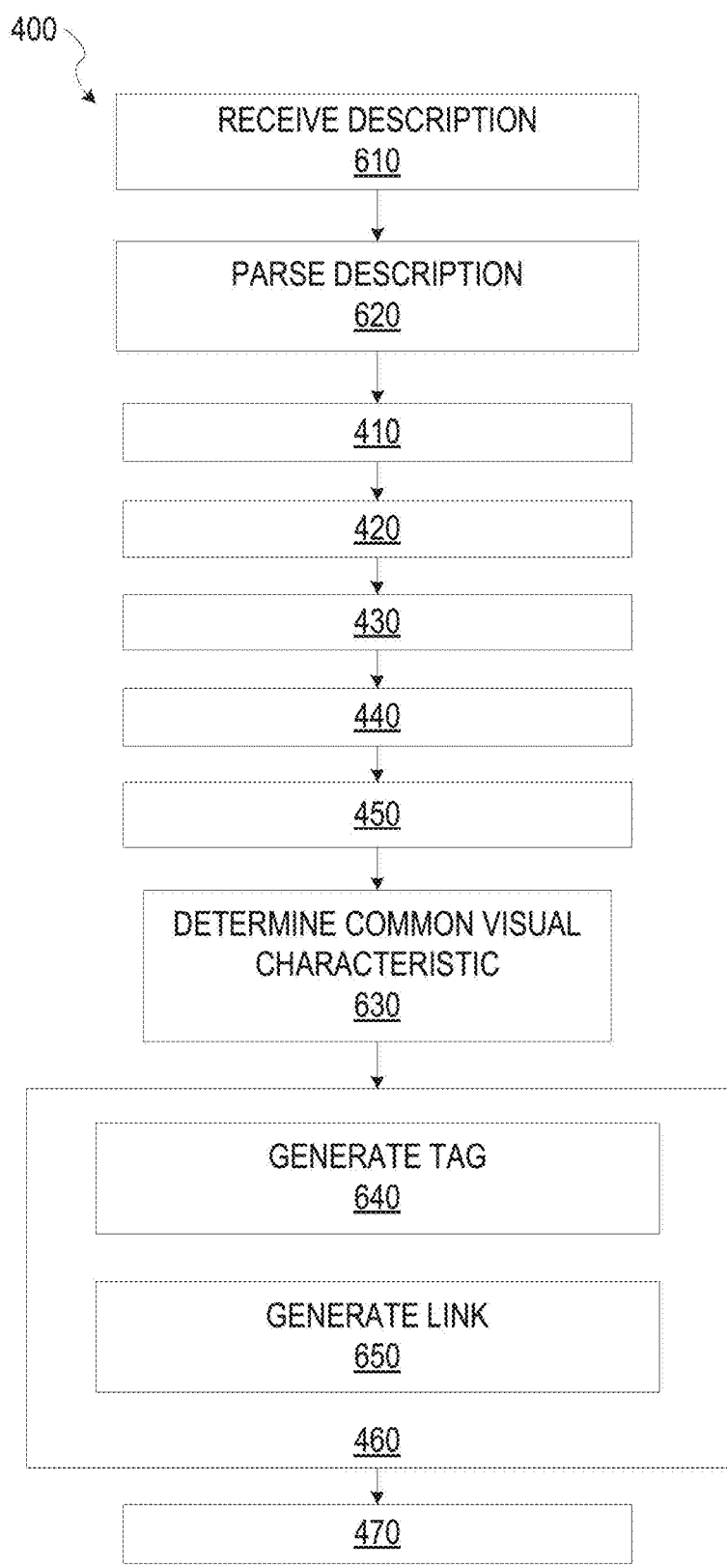

FIG. 4-6 are flowcharts illustrating operations of the bidirectional image system 150 in performing a method 400 of projecting a visual aspect into a vector space, according to some example embodiments. Operations in the method 400 may be performed in part or in whole by components of the bidirectional image system 150, which can be embodied either in whole or in part in one or more application servers 140 of a networked system 102 using components described above with respect to FIG. 2. Accordingly, the method 400 is described by way of example with reference to the bidirectional image system 150. However, it shall be appreciated that at least some of the operations of the method 400 may be deployed on various other hardware configurations or be performed by similar components residing elsewhere in the network architecture 100. Therefore, the method 400 is not intended to be limited to the bidirectional image system 150. As shown in FIG. 4, the method 400 includes operations 410, 420, 430, 440, 450, 460, and 470.

At operation 410, the receiver module 310 receives a query that includes visual data from a client device. As stated earlier, the visual data includes an image of an item. In some instances, the image of the item is uploaded by a user operating a client device (e.g., the client device 110). Moreover, the image of the item uploaded by the user as part of a search query.

At operation 420, the analyzer module 320 analyzes an aspect that is indicated in the visual data. In some instances, the analyzer module 320 analyzes a visual aspect that is depicted in a section of the image of the item. As stated earlier, visual aspects are characteristics of features of the image that are visually perceptible. Aspects include a shape of the item, a design or pattern indicated in the item, a color of the item, and the like. Other visual aspects may include brightness of the image, a perceived texture of the image, and the like. Other visual aspects may also include a placement of the item. The placement of the item may be determined by analyzing angles that are formed from a shape or outline of the item.

At operation 430, the generator module 330 generates one or more symbols that correspond to the analyzed aspect. The symbols may include alphanumeric characters or values which are used to describe the analyzed visual aspect. In some instances, if a word that describes the visual aspect is parsed from a description, that word is used to generate the one or more symbols, as further explained below with respect to operation 610. If the word is not parsed from the description, the generator module 330 generates other symbols that map to the analyzed visual aspect. In various example embodiments, the generator module 330 generates the one or more symbols based on a mapping. Moreover, as stated above, the mapping is generated by a neural network.

At operation 440, the projector module 340 projects the analyzed aspect into a vector space using the one or more symbols. For example, the projector module 340 converts the generated symbols into coordinates in the vector space. Once the conversion is complete, the projector module 340 projects the aspect into the vector space using the coordinates. The result is a projection of the visual aspect in the vector space. Moreover, the projection occupies a position in the vector space indicated by the coordinates.

At operation 450, the analyzer module 320 identifies a group of projections that are within a predetermined distance from the projected aspect in the vector space. The analyzer module 320, in some instances, calculates a distance between the projection of the aspect in the vector and the group of projections. As stated earlier, projections that are closer to one another in the vector space will have more similar characteristics.

In various example embodiments, the group of projections are projections of further visual aspects that are indicated by further visual data. The further visual data includes images or descriptions of the further visual aspects. In some instances, the further visual aspects are visual aspects of a group of items. Accordingly, the further visual data includes information or data regarding the group of items. For example, the further visual data includes item listings of the group of items and images or descriptions of the group of items. In some instances, the further visual data is also stored in a database, as further explained below.

At operation 460, the generator module 330 generates an interface of further visual aspects that correspond to the group of projections. The interface of the further visual aspects include the images of the group of items. The group of items may be indicated in a table that is stored in a database (e.g., database 126). Therefore, information regarding the group of items is stored in the database. Information regarding the group of items is also be received from sellers of the group of items. For instance, the bidirectional image system 150 receives the information from a seller when the seller provides information to publish the item in an item listing. The information received from the sellers is stored in the database.

In various example embodiments, the generator module 330 also generates, in the user interface, a description of the further items. As a result, the interface generated by the generator module 330 will include images of the further visual aspects and descriptions of the further visual aspects.

At operation 470, transmitter module 350 causes display of the generated interface of the further visual aspects. In other words, the transmitter module 350 transmits data to the client device which results in the generated interface of further visual aspects being displayed on a screen of the client device.

As shown in FIG. 5, the method 400 may include one or more of operations 510, 520, and 530. As shown, operation 510 may be performed as a part of the operation 430 as a subroutine. As further shown, the operations 520 and 530 may be performed as part of the operation 450 as a subroutine or as a prerequisite task.

At operation 510, the analyzer module 320 analyzes a visual aspect depicted in an image of the item. In some instances, the analyzer module 320 extracts the visual aspect from a section of the image. In various example embodiments, the analyzer module 320 identifies the section of the image that depicts the visual aspect and crops the section of the image from the rest of the image. Therefore, the section of the image includes and depicts the visual aspect.

At operation 520, the analyzer module 320 determines a position of the projected visual aspect. In some instances, the analyzer module 320 calculates the position of the projected visual aspect. In further instances, the analyzer module 320 retrieves the position of the projected visual aspect from a database. The position of the projected visual aspect, in some instances, is indicated by vector coordinates.

At operation 530, the analyzer module 320 determines that the group of projections are within the predetermined distance from the position of the projected visual aspect. Using the coordinates, the analyzer module 320 measures a distance from the group of projections to the position of the projected visual aspect in order to perform the determination of the operation 530.

As shown in FIG. 6, the method 400 may include one or more of operations 610, 620, 630, 640, and 650. The operations 610 and 620 may be performed prior to the operation 410. Further, the operation 630 may be performed after the operation 450, and prior to the operation 460. The operations 640 and 650 may be performed as a subroutine of the operation 460.

At operation 610, the receiver module 310 receives a description that corresponds to the visual data. As stated earlier, the visual data includes an image of an item. Therefore, the description may include words which describe the item. For example, the description includes words that are inputs to client device operated by a user that is viewing the image of the item. The description may also be received as part of the search query from the user. Accordingly, the search query is a hybrid search query that includes both the description and the visual data. Further, the bidirectional image system 150 may use the hybrid search query as data to train the neural network. This is because the hybrid search query, in some instances, includes a previous mapping of a visual aspect to a description that can be used to train the neural network.

At operation 620, the analyzer module 320 parses the description that corresponds to the visual data to identify a keyword that describes a visual aspect indicated in the visual data. As an example, the image may be an image of a bed frame. If the analyzed visual aspect is a shape of the bed frame, the analyzer module 320 will parse the description of the bed frame to find words that describe the shape of the bed frame. A further example, the image may be an image of bed sheets. If the analyzed visual aspect is a pattern or style that is visible on bed sheets, the analyzer module 320 will parse the description of the bed sheets to find words that also describe the pattern or style. An even further example, the visual aspect may include a placement of the bed frame. Accordingly, the analyzer module 320 will parse the description to find words that describe the placement of the bed frame. The words that describe the visual aspect are then used by the generator module 330 to generate symbols that correspond to the visual aspect, as described in the operation 430.

At operation 630, the analyzer module 320 determines that the visual aspect and the further visual aspects share a common characteristic. The analyzer module 320 may reference the visual data and the further visual data to confirm that the common characteristic is present in the visual aspect and the further visual aspects. For instance, the analyzer module 320 determines that the visual aspect and the further visual aspects include a circular shape. As another example, the analyzer module 320 determines that the visual aspect and the further visual aspects are all the same color, have a similar design, or have a similar shape. In various example embodiments, the common characteristic corresponds to a category of items.

At operation 640, the generator module 330 generates a tag that indicates the common characteristic. In some instances, the tag is a name or label used to describe the common characteristic. Moreover, the generator module 330 generates the tag to be included in the interface. Further, the label includes terms that may have been absent from the search query received the user.

At operation 650, the generator module 330 generates a link in the user interface. Since the further visual aspects may include specific aspects of an item from an item listing, the link is selectable by a user to view the item listing. As stated earlier, the further visual aspects are visual aspects of a group of items. Accordingly, the item listing is an item from the group of items. Moreover, the link allows for the user to view items that include aspects similar to the image uploaded by the user.

Figure 7:
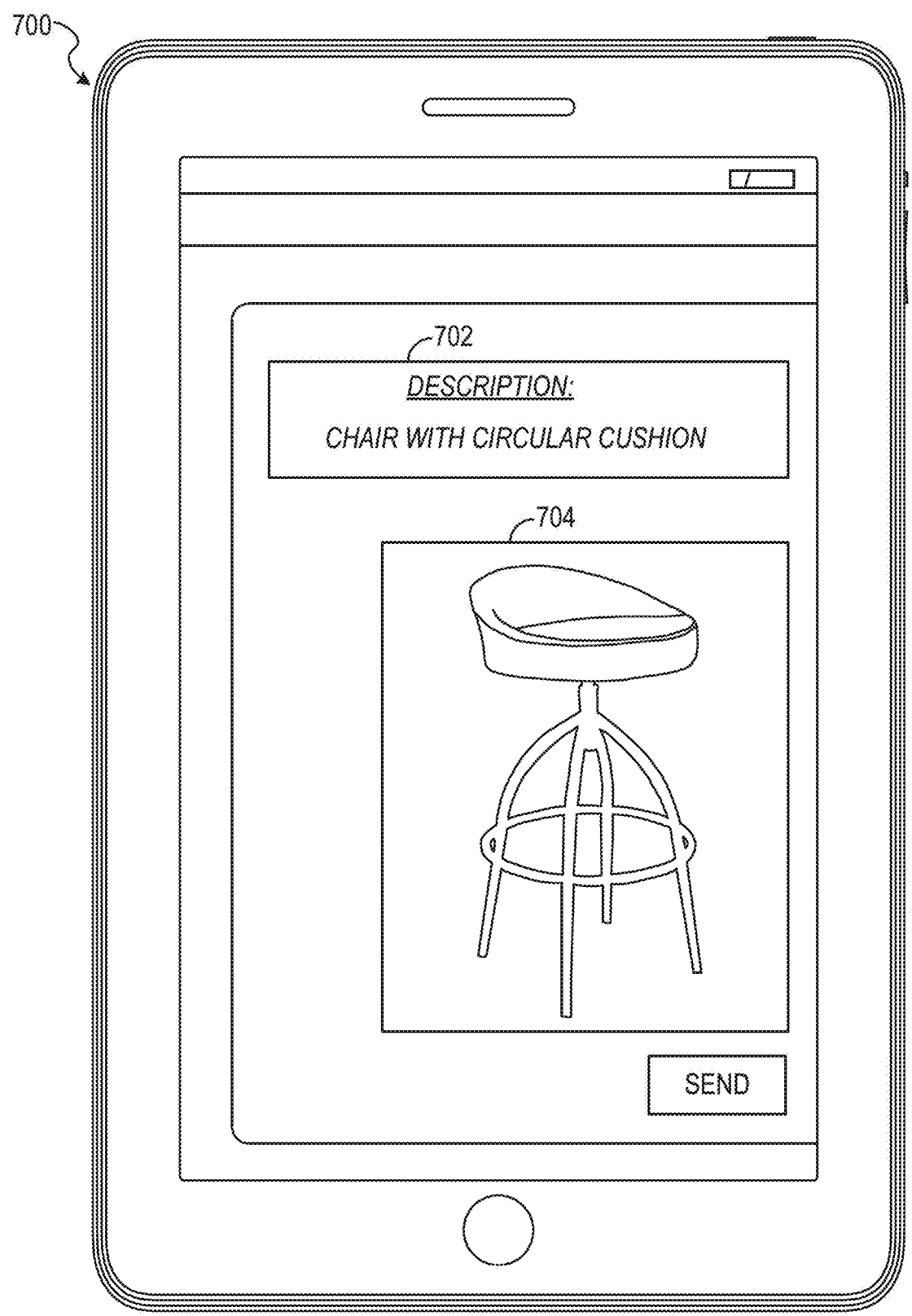
FIG. 7 is an example block diagram that depicts a user interface that includes visual data, according to some example embodiments.

FIG. 7 is an example block diagram that depicts a user interface 700 that includes visual data, according to some example embodiments. As shown in FIG. 7, the user interface 700 includes a description 702 and an image 704. Both the description 702 and the image 704 are considered visual data. Moreover, the description 702 and the image 704 are uploaded by a user operating a client device. Once the description 702 and the image 704 are uploaded by the user, they are received by the bidirectional image system 150. Reception of the visual data also corresponds to the operation 410 of FIG. 4. In various example embodiments, the image 704 also depicts a visual aspect that is projected into a vector space.

Figure 8:
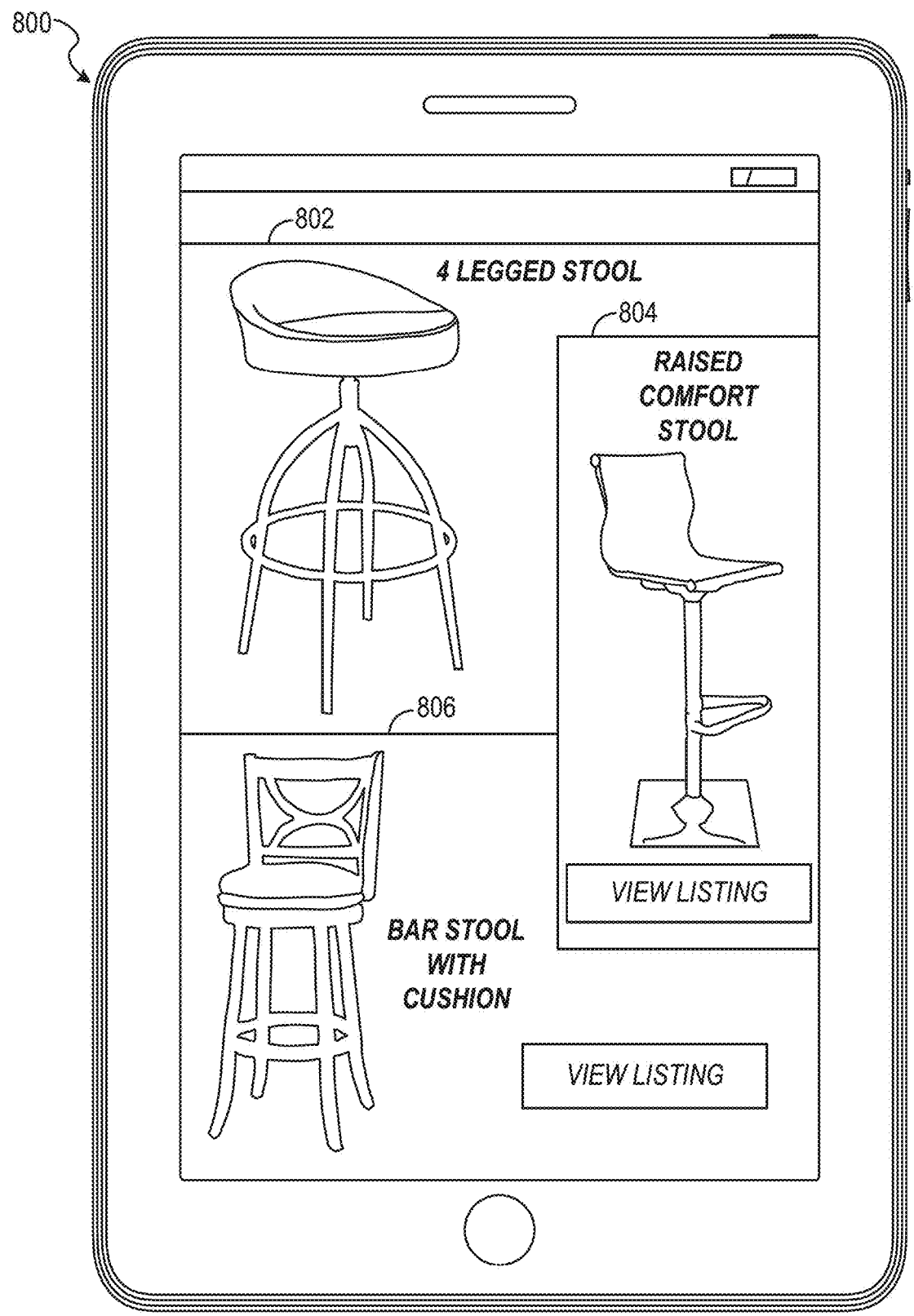
FIG. 8 is an example block diagram that depicts a user interface that includes search results, according to some example embodiments.

FIG. 8 is an example block diagram that depicts a user interface 800 that includes search results, according to some example embodiments. As shown in FIG. 8, the user interface 800 includes three sections including a first section 802, a second section 804, and a third section 806. The first section 802 depicts the image uploaded by the user as shown in FIG. 7. The second section 804 depicts a second item and the third section 806 depicts a third item. The second item and the third item depict visual aspects that are included in a group of projections identified in the operation 450 of FIG. 4. As also shown in FIG. 8, the user interface 800 includes links that are selectable to view items pages of the items in the search result. Each of the search results includes a description that indicates a common characteristic (e.g., stool) among the search results. For example, the bidirectional image system 150 determines that the search results each include a circular shape around the legs of the stool.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 9:
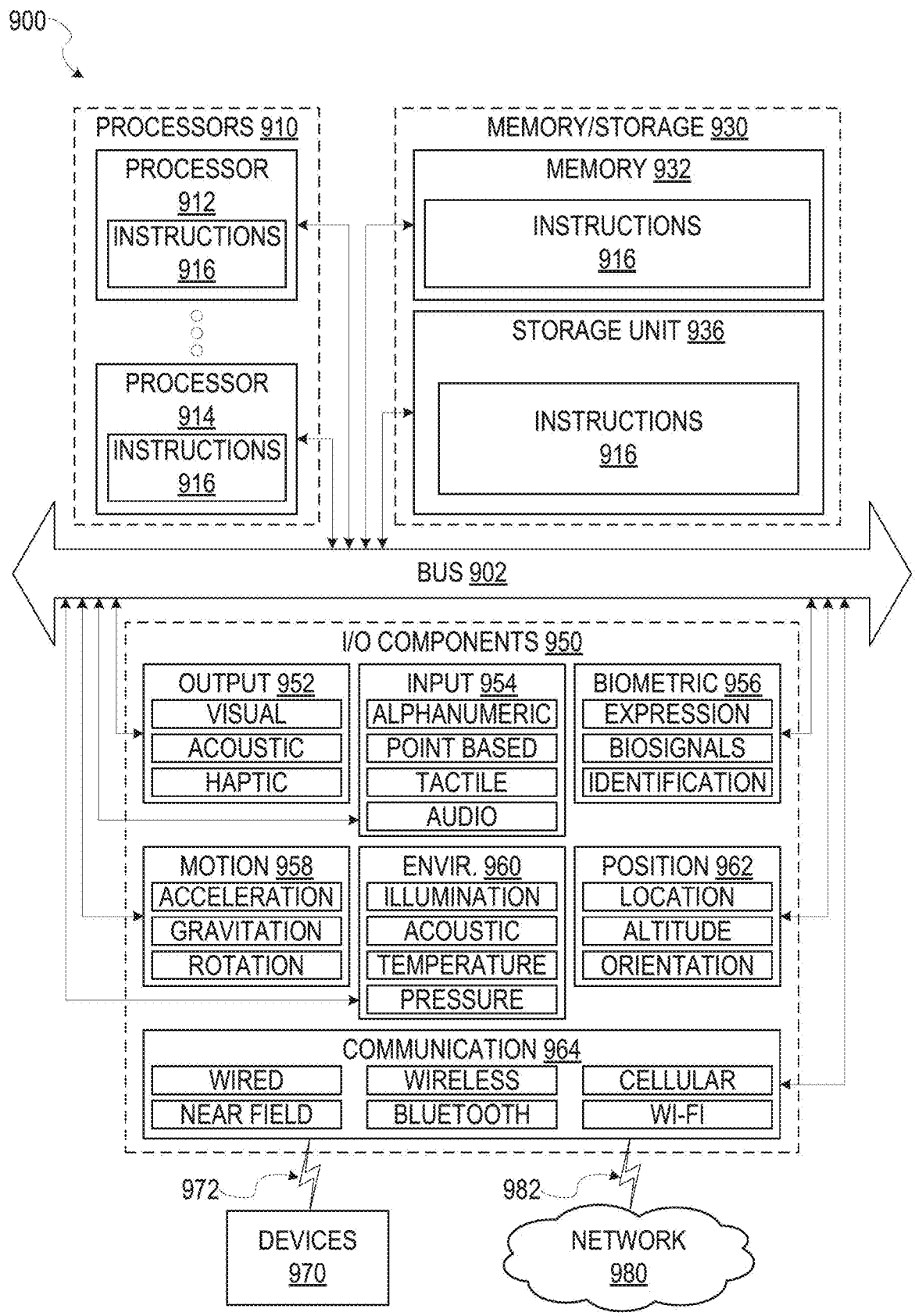
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions may cause the machine to execute the flow diagrams of FIGS. 4-6. The instructions transform the general, non-programmed machine into a particular machine specially configured to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-topeer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

analyzing a visual aspect indicated in visual data obtained from a query received from a client device;

generating a mapping based at least in part on data that indicates a predetermined relationship between one or more further symbols and one or more further visual aspects;

generating, based at least in part on the mapping, one or more symbols that correspond to the analyzed visual aspect;

projecting the analyzed visual aspect into a vector space using the one or more symbols;

automatically identifying a group of projections that are within a predetermined distance from the projected visual aspect in the vector space, the group of projections being projections of further visual aspects indicated in further visual data;

determining that the visual aspect and the further visual aspects share a common characteristic;

in response to the determining, generating a user interface that displays the visual data and the further visual data, and depicts a tag indicating the common characteristic; and causing display of the generated user interface on the client device.

2. The method of claim 1, wherein the mapping is generated by at least a neural network.

3. The method of claim 1, further comprising:

receiving a description that corresponds to the visual data; and parsing the description to identify a keyword describing the visual aspect indicated in the visual data.

4. The method of claim 3, wherein the generating the one or more symbols is based at least in part on the keyword parsed from the description.

5. The method of claim 1, further comprising:

receiving the further visual data from a further client device; and storing the further visual data in a database.

6. The method of claim 1, wherein:

the further visual aspects are visual aspects of a group of items; and the further visual data includes images of the group of items.

7. The method of claim 6, wherein:

the further visual data includes an item listing of an item from the group of items and the user interface is generated to display a link that is selectable to cause display of the item listing.

8. The method of claim 1, wherein the identifying the group of projections that are within a predetermined distance from the projected visual aspect in the vector space includes:

determining a position of the projected visual aspect in the vector space; and determining that the group of projections are within the predetermined distance from the position of the projected visual aspect.

9. The method of claim 1, further comprising causing display of a user interface on the client device, the user interface prompting for a label of the tag.

10. A system comprising:

one or more hardware processors; and a memory storing executable instructions that, when executed by the one or more hardware processors, cause the one or more hardware processors to perform operations comprising:

receiving a query that includes visual data from a client device;

analyzing a visual aspect indicated in the visual data;

generating one or more symbols that correspond to the analyzed visual aspect;

projecting the analyzed visual aspect into a vector space using the one or more symbols;

automatically identifying a group of projections that are within a predetermined distance from the projected visual aspect in the vector space, the group of projections being projections of further visual aspects indicated in further visual data;

determining that the visual aspect and the further visual aspects share a common characteristic;

in response to the determining, generating a user interface that depicts a tag indicating the common characteristic; and causing display of the generated user interface on the client device.

11. The system of claim 10, wherein the operations further comprise:

generating a mapping by at least a neural network based at least in part on data that indicates a predetermined relationship between one or more further symbols and one or more further visual aspects, wherein the one or more symbols are generated based at least in part on the mapping.

12. The system of claim 10, wherein the operations further comprise:

receiving a description that corresponds to the visual data; and parsing the description to identify a keyword describing the visual aspect indicated in the visual data.

13. The system of claim 12, wherein the generating the one or more symbols is based at least in part on the keyword parsed from the description.

14. The system of claim 10, wherein:

the further visual aspects are visual aspects of a group of items; and the further visual data includes images of the group of items.

15. The system of claim 14, wherein:

the further visual data includes an item listing of an item from the group of items; and generating the user interface includes generating a link that is selectable to view the item listing.

16. The system of claim 10, wherein the identifying the group of projections that are within a predetermined distance from the projected visual aspect in the vector space includes:

determining a position of the projected visual aspect in the vector space; and determining that the group of projects are within the predetermined distance from the position of the projected visual aspect.

17. A non-transitory machine-readable medium storing instruction that, when executed by one or more hardware processors of a machine, cause the machine to perform operations comprising:

analyzing a visual aspect indicated in visual data obtained from a query received from a client device;

generating a mapping based at least in part on data that indicates a predetermined relationship between one or more further symbols and one or more further visual aspects;

generating, based at least in part on the mapping, one or more symbols that correspond to the analyzed visual aspect;

projecting the analyzed visual aspect into a vector space using the one or more symbols;

automatically identifying a group of projections that are within a predetermined distance from the projected visual aspect in the vector space, the group of projections being projections of further visual aspects indicated in further visual data;

determining that the visual aspect and the further visual aspects share a common characteristic;

in response to the determining, generating a user interface that displays the visual data and the further visual data, and depicts a tag indicating the common characteristic; and causing display of the generated user interface on the client device.

* * * * *